(12) United States Patent
Saito et al.

(10) Patent No.: US 11,403,469 B2
(45) Date of Patent: Aug. 2, 2022

(54) SENTENCE GENERATION DEVICE, MODEL LEARNING DEVICE, SENTENCE GENERATION METHOD, MODEL LEARNING METHOD, AND PROGRAM

(71) Applicant: NIPPON TELEGRAPH AND TELEPHONE CORPORATION, Tokyo (JP)

(72) Inventors: Itsumi Saito, Tokyo (JP); Kyosuke Nishida, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/262,512

(22) PCT Filed: Jul. 23, 2019

(86) PCT No.: PCT/JP2019/028837
§ 371 (c)(1),
(2) Date: Jan. 22, 2021

(87) PCT Pub. No.: WO2020/022328
PCT Pub. Date: Jan. 30, 2020

(65) Prior Publication Data
US 2021/0294985 A1    Sep. 23, 2021

(30) Foreign Application Priority Data
Jul. 24, 2018 (JP) .............................. JP2018-138763

(51) Int. Cl.
*G06F 40/40* (2020.01)
*G06F 40/166* (2020.01)
(Continued)

(52) U.S. Cl.
CPC ............ *G06F 40/40* (2020.01); *G06F 40/166* (2020.01); *G06F 40/289* (2020.01); *G06N 3/08* (2013.01); *G06F 40/30* (2020.01)

(58) Field of Classification Search
CPC ...... G06F 40/40; G06F 40/166; G06F 40/289; G06F 40/30; G06F 40/151; G06F 40/44; G06F 40/56; G06F 40/216; G06N 3/08
(Continued)

(56) References Cited

U.S. PATENT DOCUMENTS

2008/0052073 A1* 2/2008 Goto .................... G10L 15/06
704/251

FOREIGN PATENT DOCUMENTS

JP 2012212329 A 1/2012

OTHER PUBLICATIONS

Tung et al. (2017) "Determining Entailment of Questions in the Quora Dataset," Paper; Department of Computer Science; vStanford University, 8 pages.

* cited by examiner

*Primary Examiner* — Thierry L Pham

(57) ABSTRACT

The present invention makes it possible to generate a paraphrastic sentence that has a similar meaning to the original sentence despite a local word/phrase difference, or a non-paraphrastic sentence that is not a paraphrase despite having a similar meaning to the original sentence in terms of the entire sentence. An estimation unit 22 estimates a word deletion probability for each of words constituting an input sentence, by using a positive example model that has been trained based on a positive example constituted by a sentence and a paraphrastic sentence of the sentence, and is used to generate a paraphrastic sentence by deleting a word, or by using a negative example model that has been trained based on a negative example constituted by the sentence and
(Continued)

a non-paraphrastic sentence of the sentence, and is used to generate a non-paraphrastic sentence by deleting a word.

20 Claims, 5 Drawing Sheets

(51) Int. Cl.
*G06F 40/289* (2020.01)
*G06N 3/08* (2006.01)
*G06F 40/30* (2020.01)

(58) Field of Classification Search
USPC ............................................................ 704/9
See application file for complete search history.

Fig. 3

FIRST SENTENCE: what are natural numbers ?

SECOND SENTENCE: what is a least natural number ?

|  | Which is the best treatment for psorisis ? |
| --- | --- |
| DELETION PROBABILITIES FROM NEGATIVE EXAMPLE MODEL | 0.2  0.5  0.4  0.4  0.1  0.7  0.65 |
| DELETION PROBABILITIES FROM POSITIVE EXAMPLE MODEL | 0.1  0.3  0.4  0.2  0.1  0.3  0.25 |

SENTENCE GENERATION DEVICE, MODEL LEARNING DEVICE, SENTENCE GENERATION METHOD, MODEL LEARNING METHOD, AND PROGRAM

CROSS-REFERENCE TO RELATED APPLICATIONS

This application is a U.S. 371 Application of International Patent Application No. PCT/JP2019/028837, filed on 23 Jul. 2019, which application claims priority to and the benefit of JP Application No. 2018-138763, filed on 24 Jul. 2018, the disclosures of which are hereby incorporated herein by reference in their entireties.

TECHNICAL FIELD

The present invention relates to a sentence generation apparatus, a model training apparatus, a sentence generation method, a model training method, and a program, and particularly to a sentence generation apparatus, a model training apparatus, a sentence generation method, a model training method, and a program for generating a paraphrastic sentence or a non-paraphrastic sentence.

BACKGROUND ART

Conventionally, there is a technique for determining whether or not a determination target sentence is a paraphrase of another sentence, using a machine learning model trained in advance by using a triplet consisting of two sentences and a label that indicates whether or not the pair of sentences have a paraphrastic relationship, as training data. For example, there is a technique for determining whether or not a question sentence 1 and a question sentence 2 are paraphrases of each other, using a model that employs a neural network (NPL 1).

CITATION LIST

Non Patent Literature

[NPL 1] Albert Tung, Eric Xu, "Determining Entailment of Questions in the Quora Dataset", 2017.

SUMMARY OF THE INVENTION

Technical Problem

However, in order to perform paraphrastic sentence determination using a conventional technique, it is necessary to prepare many pieces of data annotated with a paraphrastic label indicating whether or not it is a paraphrastic sentence (e.g. information indicating "0" or "1", such as "is dupulicate" in FIG. 2). Therefore, there is a problem in that the cost of manually annotating all paraphrastic expressions is enormous.

In particular, there is a problem in that, in cases where a sentence has a different meaning from the original sentence due to a local word/phrase difference despite words or the entire sentence having a similar meaning to the original, it is impossible to manually prepare annotated data that covers all of such cases.

With the foregoing in view, it is an object of the present invention to provide a sentence generation apparatus, a sentence generation method, and a program that are capable of generating a paraphrastic sentence that has a similar meaning to the original sentence despite a local word/phrase difference, or a non-paraphrastic sentence that is not a paraphrase of the original sentence despite having a similar meaning to the original sentence in terms of the entire sentence.

It is another object of the present invention to provide a model training apparatus, a model training method, and a program that are capable of training a model for generating a paraphrastic sentence that has a similar meaning to the original sentence, or a non-paraphrastic sentence that is not a paraphrase of the original sentence despite having a similar meaning to the original sentence in terms of the entire sentence.

Means for Solving the Problem

A sentence generation apparatus according to the present invention includes: an estimation unit that estimates a word deletion probability for each of words constituting an input sentence, by using a positive example model that has been trained based on a positive example constituted by a sentence and a paraphrastic sentence of the sentence, and is used to generate a paraphrastic sentence by deleting a word, or by using a negative example model that has been trained based on a negative example constituted by the sentence and a non-paraphrastic sentence of the sentence, and is used to generate a non-paraphrastic sentence by deleting a word.

An sentence generation method according to the present invention includes: estimating, using an estimation unit, a word deletion probability for each of words constituting an input sentence, by using a positive example model that has been trained based on a positive example constituted by a sentence and a paraphrastic sentence of the sentence, and is used to generate a paraphrastic sentence by deleting a word, or by using a negative example model that has been trained based on a negative example constituted by the sentence and a non-paraphrastic sentence of the sentence, and is used to generate a non-paraphrastic sentence by deleting a word.

According to the sentence generation apparatus and the sentence generation method according to the present invention, an estimation unit estimates a word deletion probability for each of the words constituting an input sentence, by using a positive example model that has been trained based on a positive example constituted by a sentence and a paraphrastic sentence of the sentence, and is used to generate a paraphrastic sentence by deleting a word, or by using a negative example model that has been trained based on a negative example constituted by the sentence and a non-paraphrastic sentence of the sentence, and is used to generate a non-paraphrastic sentence by deleting a word.

In this way, it is possible to generate a paraphrastic sentence that has a similar meaning to the original sentence despite a local word/phrase difference, or a non-paraphrastic sentence that is not a paraphrase of the original sentence despite having a similar meaning to the original sentence in terms of the entire sentence, by estimating a word deletion probability for each of the words constituting an input sentence, by using a positive example model that has been trained based on a positive example constituted by a sentence and a paraphrastic sentence of the sentence, and is used to generate a paraphrastic sentence by deleting a word, or by using a negative example model that has been trained based on a negative example constituted by the sentence and a non-paraphrastic sentence of the sentence, and is used to generate a non-paraphrastic sentence by deleting a word.

Also, the estimation unit included in the sentence generation apparatus according to the present invention may attach, to each of the words constituting the input sentence, the word deletion probability of the word by using the positive example model, and the word deletion probability of the word by using the negative example model, and the sentence generation apparatus may further comprise a deletion unit that, for each of the words constituting the input sentence, if the word deletion probability attached to the word by using the positive example model is no less than a predetermined first threshold value and the word deletion probability attached to the word by using the negative example model is no greater than a predetermined second threshold value, deletes the word from the input sentence to compose a paraphrastic sentence of the input sentence, or, for each of the words constituting the input sentence, if the word deletion probability attached to the word by using the positive example model is no greater than the predetermined first threshold value and the word deletion probability attached to the word by using the negative example model is no less than the predetermined second threshold value, deletes the word from the input sentence to compose a non-paraphrastic sentence of the input sentence.

A model training apparatus according to the present invention includes: an input unit that receives input training data that consists of data sets each including a pair of sentences and a paraphrastic label that indicates that the pair is a positive example in which one of the sentences is a paraphrastic sentence of the other, or a negative example in which one of the sentences is a non-paraphrastic sentence of the other; an alignment unit that calculates word alignment between the pair of sentences, and for each word in the pair of sentences, if the word does not have an alignment destination, attaches a deletion label to the word, and if the word has an alignment destination, attaches a non-deletion label to the word; and a training unit that, when sentences paired with the paraphrastic label indicating that the sentences constitute a positive example are used as inputs from among the sentences processed by the alignment unit, trains a positive example model for generating a paraphrastic sentence by deleting a word, such that an output matches the deletion labels and the non-deletion labels attached to the sentence by the alignment unit, or when sentences paired with the paraphrastic label indicating that the sentences constitute a negative example are used as inputs from among the sentences processed by the alignment unit, trains a negative example model for generating a non-paraphrastic sentence by deleting a word, such that an output matches the deletion labels and the non-deletion labels attached to the sentence by the alignment unit.

A model training method according to the present invention includes: receiving, using an input unit, input training data that consists of data sets each including a pair of sentences and a paraphrastic label that indicates that the pair is a positive example in which one of the sentences is a paraphrastic sentence of the other, or a negative example in which one of the sentences is a non-paraphrastic sentence of the other; calculating, using an alignment unit, word alignment between the pair of sentences, and for each word in the pair of sentences, if the word does not have an alignment destination, attaching a deletion label to the word, and if the word has an alignment destination, attaching a non-deletion label to the word; and when sentences paired with the paraphrastic label indicating that the sentences constitute a positive example are used as inputs from among the sentences processed by the alignment unit, training, using a training unit, a positive example model for generating a paraphrastic sentence by deleting a word, such that an output matches the deletion labels and the non-deletion labels attached to the sentence by the alignment unit, or when sentences paired with the paraphrastic label indicating that the sentences constitute a negative example are used as inputs from among the sentences processed by the alignment unit, training, using the training unit, a negative example model for generating a non-paraphrastic sentence by deleting a word, such that an output matches the deletion labels and the non-deletion labels attached to the sentence by the alignment unit.

According to the model training apparatus and the model training method according to the present invention, the input unit receives input training data that consists of data sets each including a pair of sentences and a paraphrastic label that indicates that the pair is a positive example in which one of the sentences is a paraphrastic sentence of the other, or a negative example in which one of the sentences is a non-paraphrastic sentence of the other, and the alignment unit calculates word alignment between the pair of sentences, and for each word in the pair of sentences, if the word does not have an alignment destination, attaches a deletion label to the word, and if the word has an alignment destination, attaches a non-deletion label to the word.

When sentences paired with the paraphrastic label indicating that the sentences constitute a positive example are used as inputs from among the sentences processed by the alignment unit, the training unit trains a positive example model for generating a paraphrastic sentence by deleting a word, such that an output matches the deletion labels and the non-deletion labels attached to the sentence by the alignment unit, or when sentences paired with the paraphrastic label indicating that the sentences constitute a negative example are used as inputs from among the sentences processed by the alignment unit, the training unit trains a negative example model for generating a non-paraphrastic sentence by deleting a word, such that an output matches the deletion labels and the non-deletion labels attached to the sentence by the alignment unit.

In this way, it is possible to train a model for generating a paraphrastic sentence that has a similar meaning to the original sentence, or a non-paraphrastic sentence that is not a paraphrase of the original sentence despite having a similar meaning to the original sentence in terms of the entire sentence, by calculating word alignment between a pair of sentences, and for each word in the pair of sentences, if the word does not have an alignment destination, attaching a deletion label to the word, and if the word has an alignment destination, attaching a non-deletion label to the word, and when sentences paired with the paraphrastic label indicating that the sentences constitute a positive example are used as inputs from among the sentences processed by the alignment unit, training a positive example model for generating a paraphrastic sentence by deleting a word, such that an output matches the deletion labels and the non-deletion labels attached to the sentence by the alignment unit, or when sentences paired with the paraphrastic label indicating that the sentences constitute a negative example are used as inputs from among the sentences processed by the alignment unit, training a negative example model for generating a non-paraphrastic sentence by deleting a word, such that an output matches the deletion labels and the non-deletion labels attached to the sentence by the alignment unit.

Also, the positive example model or the negative example model for the sentence generation apparatus according to the present invention may be trained in advance by the model training apparatus.

A program according to the present invention is a program for causing a computer to function as the units included in the sentence generation apparatus or the units included in the model training apparatus.

Effects of the Invention

With the sentence generation apparatus, the sentence generation method, and the program according to the present invention, it is possible to generate a paraphrastic sentence that has a similar meaning to the original sentence despite a local word/phrase difference, or a non-paraphrastic sentence that is not a paraphrase of the original sentence despite having a similar meaning to the original sentence in terms of the entire sentence.

Also, with the model training apparatus, the model training method, and the program according to the present invention, it is possible to train a model for generating a paraphrastic sentence that has a similar meaning to the original sentence, or a non-paraphrastic sentence that is not a paraphrase of the original sentence despite having a similar meaning to the original sentence in terms of the entire sentence.

BRIEF DESCRIPTION OF DRAWINGS

FIG. 3 is a conceptual diagram showing an example of a result of alignment performed by the model training apparatus according to the embodiment of the present invention.

DESCRIPTION OF EMBODIMENTS

The following describes an embodiment of the present invention with reference to the drawings.

<Configuration of Sentence Generation System According to Embodiment of Present Invention>

Figures 1, 2:
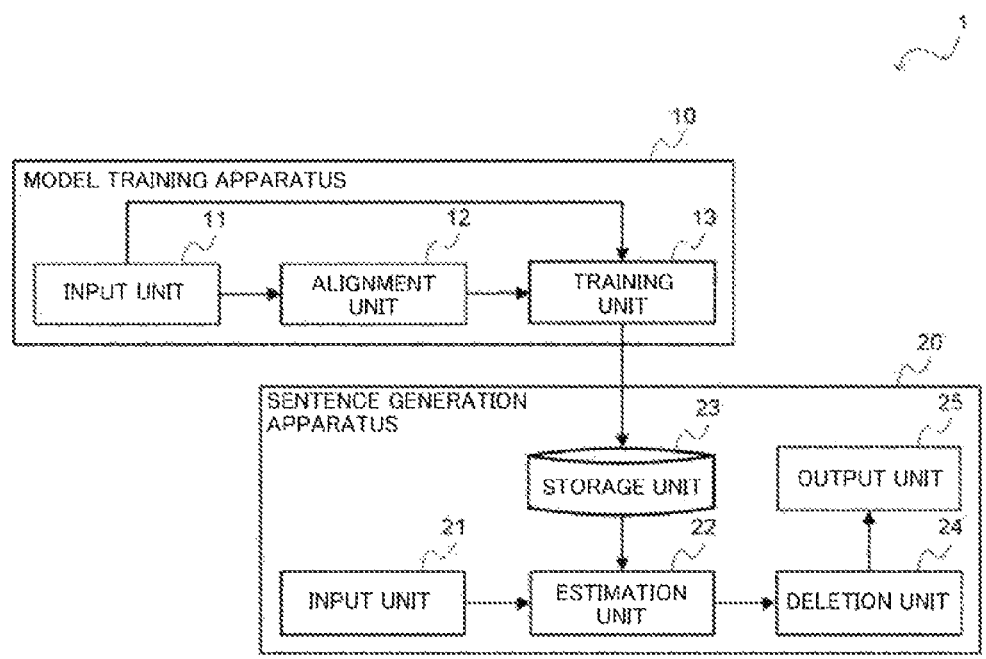
FIG. 1 is a block diagram showing a configuration of a sentence generation system according to an embodiment of the present invention.
FIG. 2 is a diagram showing an example of training data for a model training apparatus according to the embodiment of the present invention.

A configuration of a sentence generation system 1 according to an embodiment of the present invention will be described with reference to FIG. 1. FIG. 1 is a block diagram showing the configuration of the sentence generation system 1 according to the embodiment of the present invention.

The sentence generation system 1 includes a model training apparatus 10 and a sentence generation apparatus 20.

The model training apparatus 10 is constituted by a computer that includes a CPU, a RAM, and a ROM that stores a program for performing a model training processing routine described below. In terms of functionality, the model training apparatus 10 is configured as described below.

As shown in FIG. 1, the model training apparatus 10 according to the present embodiment includes an input unit 11, an alignment unit 12, and a training unit 13.

The input unit 11 receives input training data that consists of data sets each including a pair of sentences and a paraphrastic label indicating that the pair is a positive example or a negative example. The aforementioned "positive example" indicates that one sentence is a paraphrastic sentence of the other sentence. The aforementioned "negative example" indicates that one sentence is a non-paraphrastic sentence of the other sentence.

Here, a paraphrastic sentence of a given sentence is a sentence that has a similar meaning to the given sentence, and a non-paraphrastic sentence of a given sentence is a sentence that is not a paraphrase of the given sentence despite having a similar meaning to the given sentence in terms of the entire sentence.

The pair of sentences included in training data is a pair of sentences that have a paraphrastic relationship or a non-paraphrastic relationship, and is, for example, a pair of sentences in which the proportion of words corresponding to each other in the pair of sentences is no less than a predetermined proportion.

A paraphrastic label is "1" when one sentence is a paraphrastic sentence of the other sentence, and is "0" when one sentence is a non-paraphrastic sentence (i.e. is not a paraphrastic sentence) of the other sentence (FIG. 2).

For example, when a first sentence in the received training data is "what are natural numbers?", a second sentence is "what is a least natural number?", and the paraphrastic label is "0", it is meant that one sentence is a non-paraphrastic sentence of the other sentence.

The input unit 11 passes the received training data to the alignment unit 12 and the training unit 13.

The alignment unit 12 calculates word alignment between the first sentence and the second sentence. For each word in the second sentence, if the word does not have an alignment destination, the alignment unit 12 attaches a deletion label to the word, and if the word has an alignment destination, the alignment unit 12 attaches a non-deletion label to the word.

Specifically, the alignment unit 12 first calculates word alignment between the first sentence and the second sentence, using any given alignment method (e.g. "word2vec" disclosed in Reference Literature 1) (FIG. 3).

[Reference Literature 1] Yangqiu Song and Dan Roth, "Unsupervised Sparse Vector Densification for Short Text Similarity".

Based on the result of word alignment between the first sentence and the second sentence, for each word in the second sentence, if the word does not have an alignment destination, the alignment unit 12 specifies the word as a deletion word. If the word has an alignment destination, the alignment unit 12 specifies the word as a non-deletion word.

For example, in FIG. 3, "a" and "least" in the second sentence do not have an alignment destination, and therefore the alignment unit 12 specifies "a" and "least" as deletion words. In contrast, the other words have alignment destinations, and therefore the alignment unit 12 specifies the other words as non-deletion words.

Figure 4:
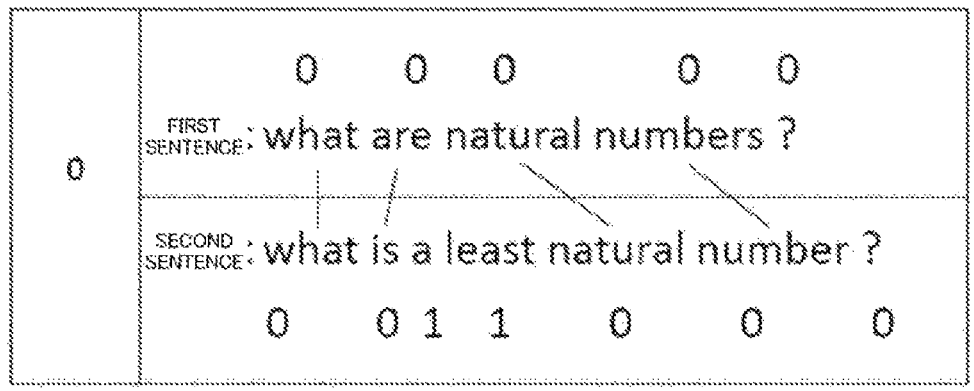
FIG. 4 is a conceptual diagram showing an example of data to which deletion/non-deletion labels are attached for the model training apparatus according to the embodiment of the present invention.

The alignment unit 12 generates data in which a deletion label (1) is attached to the deletion words corresponding to the first sentence, and a non-deletion label (0) is attached to the non-deletion words (FIG. 4).

If the paraphrastic label of training data is 1 (a paraphrastic sentence), this data serves as data for training a positive example model described below, if the paraphrastic label of training data is 0 (a non-paraphrastic sentence), this data serves as data for training a negative example model described below.

Similarly, based on the result of calculation of word alignment between the first sentence and the second sentence, for each word in the first sentence, if the word does not have an alignment destination, the alignment unit 12 attaches a deletion label to the word, and if the word has an alignment destination, the alignment unit 12 attaches a non-deletion label to the word (FIG. 4).

Here, two pieces of data, namely the data generated for the first sentence and the data generated for the second sentence, are each subjected to the following processing as irrelevant data.

Thereafter, the alignment unit 12 passes the pieces of generated data to the training unit 13.

The training unit 13 trains a positive example model for generating a paraphrastic sentence by deleting a word using the sentences included in the training data to which a paraphrastic label=1 (a paraphrastic sentence) is attached. In the aforementioned training, the training unit 13 uses, as inputs to a positive example model, sentences that are paired with a paraphrastic label indicating that the pair is a positive example, among the sentences processed by the alignment unit 12, to train the positive example model. Also, in the aforementioned training, the training unit 13 trains a positive example model such that the deletion labels and the non-deletion labels attached to the input sentences by the alignment unit 12 match the output.

Also, the training unit 13 trains a negative example model for generating a non-paraphrastic sentence by deleting a word, using the sentences included in training data to which a paraphrastic label=0 (a non-paraphrastic sentence) is attached. In the aforementioned training, the training unit 13 uses, as inputs to a negative example model, sentences that are paired with a paraphrastic label indicating that the sentences constitute a negative example, among the sentences processed by the alignment unit 12, to train the negative example model. Also, in the aforementioned training, the training unit 13 trains a negative example model such that the deletion labels and the non-deletion labels attached by the alignment unit 12 to the input sentences match the output.

Figure 5:
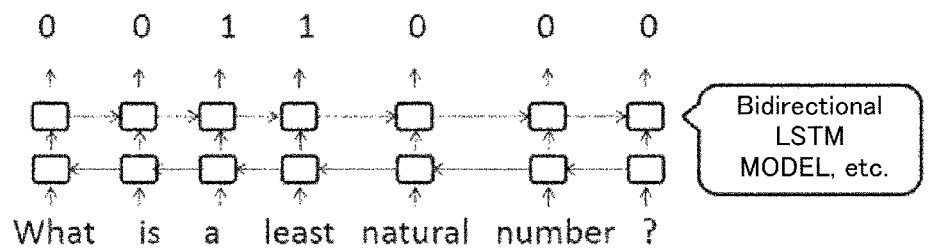
FIG. 5 is a conceptual diagram showing examples of inputs to, and outputs from, a positive example model and a negative example model for the model training apparatus according to the embodiment of the present invention.

Specifically, as shown in FIG. 5, when a sentence "what is a least natural number?" in training data to which a paraphrastic label=1 (a paraphrastic sentence) is attached is input to the positive example model, the training unit 13 trains parameters for the positive example model in the following manner. The aforementioned "trains . . . in the following manner" means that the deletion labels and the non-deletion labels "0 0 1 1 0 0 0" attached to the sentences by the alignment unit 12 match the output.

A positive example model is used to generate a paraphrastic sentence by deleting a word, and is trained using data for training a positive example model (training data with a paraphrastic label "1").

Figure 6:
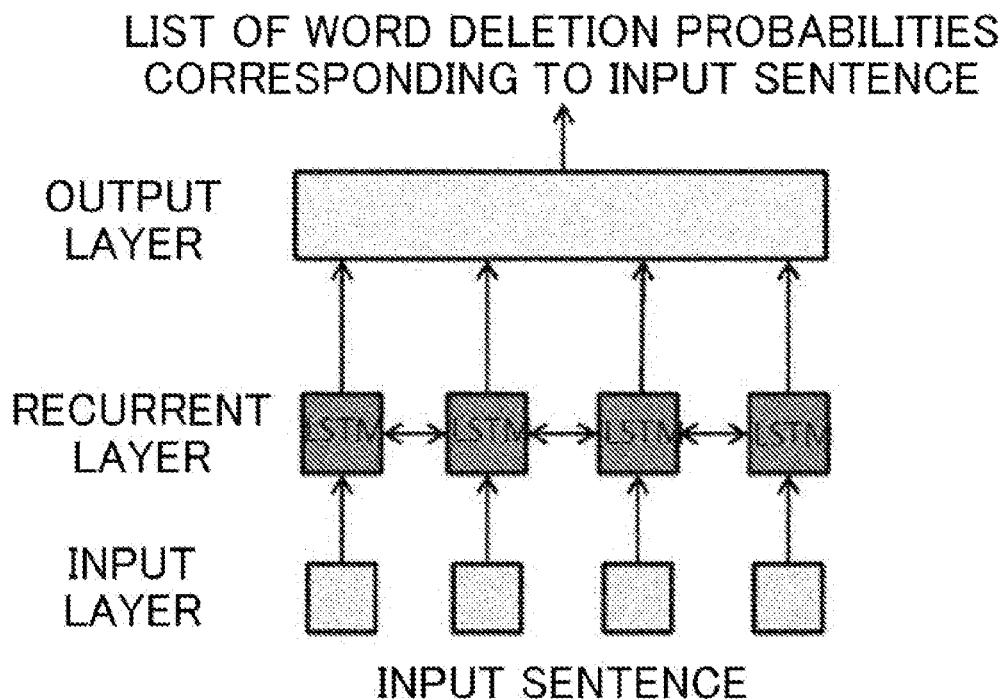
FIG. 6 is a conceptual diagram showing examples of configurations of a positive example model and a negative example model for the model training apparatus according to the embodiment of the present invention.

A positive example model may be any model if the input to the model is a sentence and the model can be used to calculate, for each word in the sentence, a word deletion probability that estimates a deletion label of the word. Any neural network model may be employed. For example, a recursive neural network such as Bidirectional LSTM shown in FIG. 6 may be used.

Also, any method may be employed as a training method (e.g. Reference Literature 2).

[Reference Literature 2] Jason P. C. Chiu, Eric Nichols, "Named Entity Recognition with Bidirectional LSTM-CNNs"

When a sentence is input to the trained positive example model, the positive example model outputs a list of deletion scores of the words included in the sentence.

Similarly, the negative example model that is used to generate a non-paraphrastic sentence by deleting a word is trained. The negative example model is trained using a data for training a negative example model (training data with a paraphrastic label "0").

The training unit 13 stores the positive example model and the negative example model that have been trained, in a storage unit 23.

Note that the training unit 13 may be configured to only train a positive example model or a negative example model.

The sentence generation apparatus 20 is a sentence generation apparatus that generates a non-paraphrastic sentence corresponding to an input sentence, and is constituted by a computer that includes a CPU, a RAM, and a ROM that stores a program for performing a sentence generation processing routine described below. In terms of functionality, the sentence generation apparatus 20 is configured as described below.

As shown in FIG. 1, the sentence generation apparatus 20 according to the present embodiment includes an input unit 21, an estimation unit 22, the storage unit 23, a deletion unit 24, and an output unit 25.

The input unit 21 receives an input sentence, and passes the received input sentence to the estimation unit 22.

The estimation unit 22 attaches, to each of the words constituting the input sentence, a word deletion probability of the word by using the positive example model, and attaches a word deletion probability of the word by using the negative example model.

Specifically, the estimation unit 22 first acquires the positive example model and the negative example model stored in the storage unit 23. Next, taking the input sentence as the input and using the positive example model, the estimation unit 22 calculates the word deletion probability of each of the words included in the input sentence, and taking the input sentence as the input and using the negative example model, the estimation unit 22 calculates the word deletion probability of each of the words included in the input sentence.

Figures 7, 8:
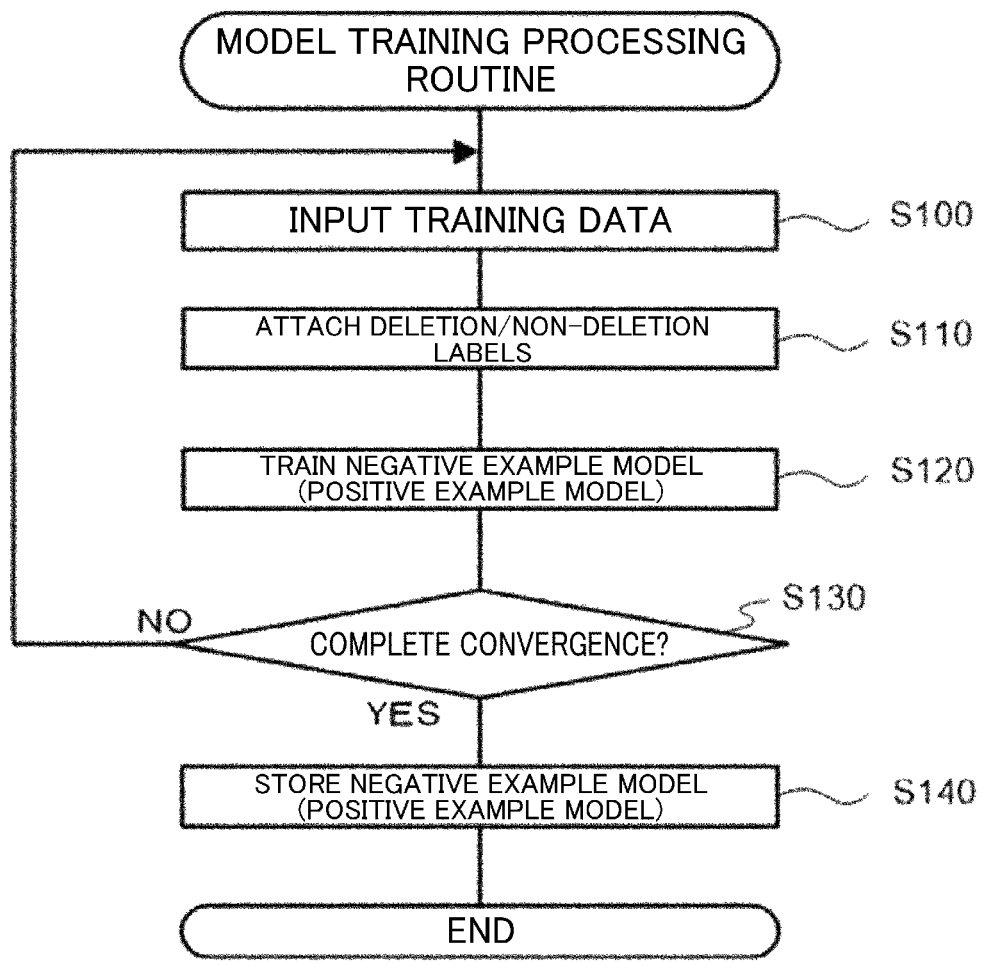
FIG. 7 is a conceptual diagram showing examples of input sentences for a sentence generation apparatus according to the embodiment of the present invention, to which word deletion probabilities are attached.
FIG. 8 is a flowchart showing a model training processing routine performed by the model training apparatus according to the embodiment of the present invention.

For example, when the input sentence is "which is the best treatment for psoriasis?" as shown in FIG. 7, the word deletion probabilities output from the positive example model are "0.1 0.3 0.4 0.2 0.1 0.3 0.25", and the word deletion probabilities output from the negative example model are "0.2 0.5 0.4 0.4 0.1 0.7 0.65".

Thereafter, the estimation unit 22 attaches the estimated word deletion probabilities from the positive example model and the estimated word deletion probabilities from the negative example model to the input sentence, and passes the sentence to the deletion unit 24.

The storage unit 23 stores the positive example model and the negative example model trained by the model training apparatus 10.

For each of the words constituting the input sentence, if the word deletion probability attached to the word by using the positive example model is no greater than a predetermined first threshold value and the word deletion probability attached to the word by using the negative example model is no less than a predetermined second threshold value, the deletion unit 24 deletes the word from the input sentence to compose a non-paraphrastic sentence of the input sentence.

Specifically, for example, if the first threshold value is 0.3 and the second threshold value is 0.5, the deletion unit 24 determines, as a non-paraphrastic sentence, "which is the best treatment?" created by deleting "for" and "psorisis", of which the word deletion probability from the positive example model is no greater than 0.3 and the word deletion probability from the negative example model is no less than 0.5, from the input sentence.

By deleting a word of which the word deletion probability from the positive example model is low and the word deletion probability from the negative example model is high, it is possible to create a sentence that is a non-paraphrastic sentence despite a high similarity to the input sentence in terms of wording and meaning.

Thereafter, the deletion unit 24 outputs the generated non-paraphrastic sentence to the output unit 25.

The output unit 25 outputs the generated non-paraphrastic sentence.

Specifically, the output unit 25 outputs the non-paraphrastic sentence as well as the input sentence to a training apparatus that trains a determination model that is used to determine whether or not two sentences are paraphrases of each other.

As the training apparatus trains a determination model by using a non-paraphrastic sentence that has been automatically generated by the sentence generation apparatus 20, a sentence that is a non-paraphrastic sentence despite a high similarity in terms of the entire sentence can be used as training data. Thus, it is possible to train a determination model that realizes accurate determination.

When determining whether or not two sentences are paraphrases of each other by using the determination model thus trained, it is possible to perform accurate determination.

<Actions of Model Training Apparatus According to Embodiment of Present Invention>

FIG. 8 is a flowchart showing a model training processing routine according to the embodiment of the present invention.

Upon training data being input to the input unit 11, model training processing routine shown in FIG. 8 is performed in the model training apparatus 10.

First, in step S100, the input unit 11 receives input training data that consists of data sets each including a pair of sentences and a paraphrastic label indicating that the pair is a positive example or a negative example. The aforementioned "positive example" indicates that one sentence is a paraphrastic sentence of the other sentence. The aforementioned "negative example" indicates that one sentence is a non-paraphrastic sentence of the other sentence.

In step S110, the alignment unit 12 calculates word alignment between the pair of sentences. For each word in the sentences, if the word does not have an alignment destination, the alignment unit 12 attaches a deletion label to the word, and if the word has an alignment destination, the alignment unit 12 attaches a non-deletion label to the word.

In step S120, the training unit 13 trains a negative example model for generating a non-paraphrastic sentence by deleting a word, using the sentences included in the training data to which a paraphrastic label=0 (a non-paraphrastic sentence) is attached. In the aforementioned training, the training unit 13 uses, as inputs to a negative example model, sentences that are paired with a paraphrastic label indicating that the pair is a positive example, among the sentences processed in the above step S110, to train the negative example model. Also, in the aforementioned training, the training unit 13 trains a negative example model such that the deletion labels and the non-deletion labels attached to the sentences in the above step S110 match the output.

In step S130, the training unit 13 determines whether or not training has converged.

Upon determining that training has not converged (YES in step S130), the training unit 13 returns to step S100 and performs processing from step S100 to step S120.

On the other hand, upon determining that training has converged (YES in step S130), the training unit 13 stores the trained negative example model in the storage unit 23 in step S140.

The above-described model training processing routine is that performed to train a negative example model. In cases where a positive example model is to be trained, the model training processing routine is partially modified as follows.

In step S120, the training unit 13 trains a positive example model for generating a paraphrastic sentence by deleting a word, using the sentences included in training data to which a paraphrastic label=1 (a paraphrastic sentence) is attached. In the aforementioned training, the training unit 13 uses, as inputs to a positive example model, sentences that are paired with a paraphrastic label indicating that the sentences constitute a negative example, among the sentences processed in the above step S110, to train the positive example model. Also, in the aforementioned training, the training unit 13 trains a negative example model such that the deletion labels and the non-deletion labels attached to the sentences in the above step S110 match the output.

In step S140, the training unit 13 stores the trained positive example model in the storage unit 23.

<Actions of Sentence Generation Apparatus According to Embodiment of Present Invention>

Figure 9:
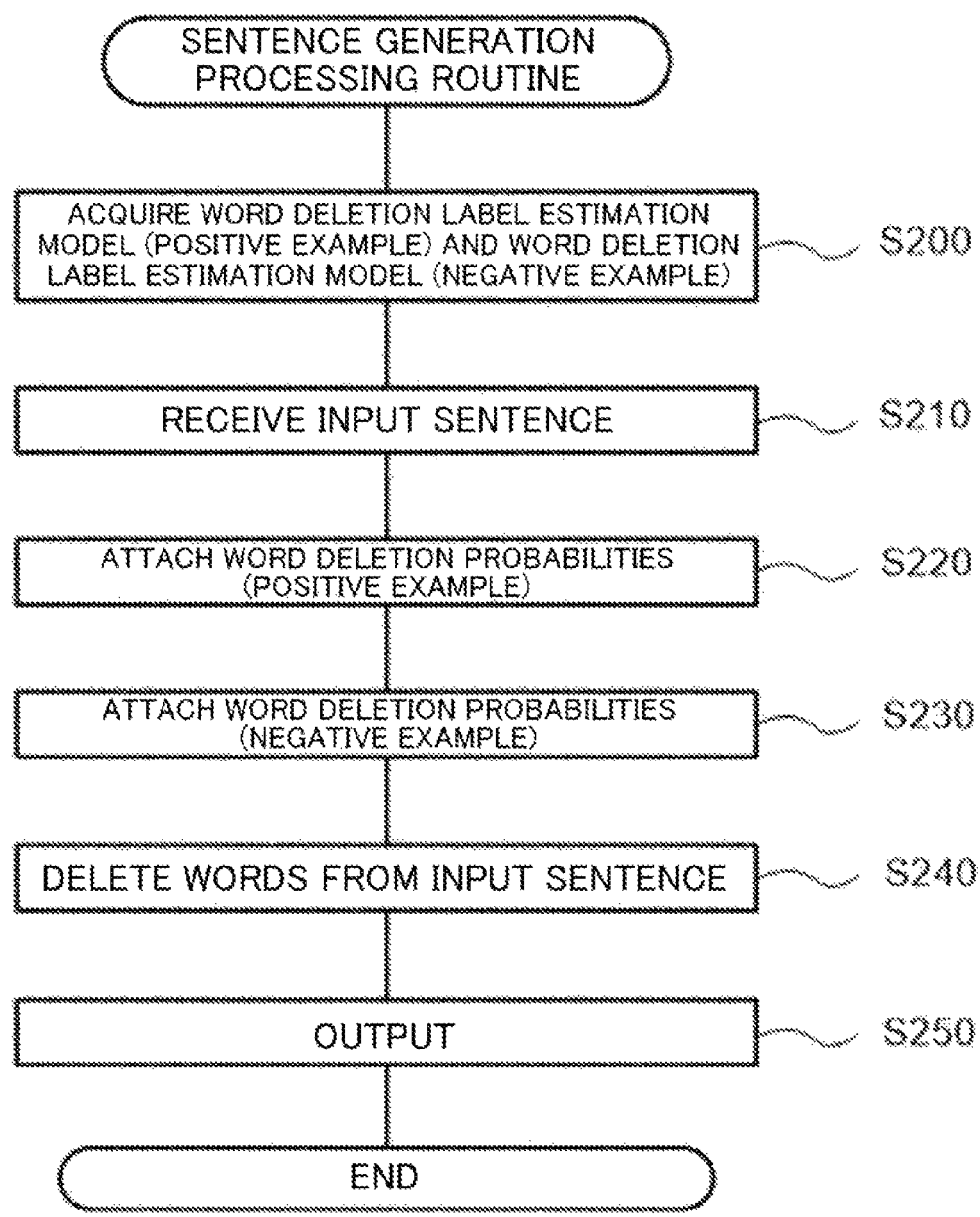
FIG. 9 is a flowchart showing a sentence generation processing routine performed by the sentence generation apparatus according to the embodiment of the present invention.

FIG. 9 is a flowchart showing a sentence generation processing routine according to the embodiment of the present invention.

Upon an input sentence being input to the input unit 21, a sentence generation processing routine shown in FIG. 9 is performed in the sentence generation apparatus 20.

First, in step S200, the estimation unit 22 first acquires the positive example model and the negative example model stored in the storage unit 23.

In step S210, the input unit 21 receives an input sentence.

In step S220, the estimation unit 22 attaches, to each of the words constituting the input sentence, a word deletion probability of the word by using the positive example model.

In step S230, the estimation unit 22 attaches, to each of the words constituting the input sentence, a word deletion probability of the word by using the negative example model. Note that step S220 and step S230 may be performed in any order, and the processing in step S220 may be performed after step S230.

In step S240, for each of the words constituting the input sentence, if the word deletion probability attached to the word by using the positive example model is no greater than the predetermined first threshold value and the word deletion probability attached to the word by using the negative example model is no less than the predetermined second threshold value, the deletion unit 24 deletes the word from the input sentence to compose a non-paraphrastic sentence of the input sentence.

In step S250, the output unit 25 outputs the non-paraphrastic sentence generated in the above step S240.

As described above, with the sentence generation apparatus according to the embodiment of the present invention, it is possible to generate a paraphrastic sentence that has a similar meaning to the original sentence, or a non-paraphrastic sentence that is not a paraphrase of the original sentence despite having a similar meaning to the original sentence in terms of the entire sentence, in the following manner. The aforementioned "to generate . . . in the following manner" means to generate a paraphrastic sentence or a non-paraphrastic sentence by, for each of the words constituting the input sentence, estimating a word deletion probability of the word. The aforementioned "positive example model" is a model trained based on a positive example constituted by sentences and paraphrastic sentences of the sentences, and is used to generate a paraphrastic sentence by deleting a word. The aforementioned "negative example model" is a model trained based on a negative example constituted by sentences and non-paraphrastic sentences of the sentences, and is used to generate a non-paraphrastic sentence by deleting a word.

Also, with the model training apparatus according to the embodiment of the present invention, word alignment between a pair of sentences is calculated. Thus, for each word in the sentences, if the word does not have an alignment destination, a deletion label is attached to the word, and if the word has an alignment destination, a non-deletion label is attached to the word. Furthermore, with the model training apparatus according to the embodiment of the present invention, it is possible to train a model for generating a paraphrastic sentence that has a similar meaning to the original sentence, or a non-paraphrastic sentence that is not a paraphrase of the original sentence despite having a similar meaning to the original sentence in terms of the entire sentence, by training a positive example model for generating a paraphrastic sentence by deleting a word, or a negative example model for generating a non-paraphrastic sentence by deleting a word. The aforementioned positive example model is a model that is trained such that, when sentences paired with a paraphrastic label indicating that the sentences constitute a positive example are used as inputs from among the aforementioned sentences, the deletion labels and the non-deletion labels attached to the sentences by the alignment unit match the output. Similarly, the aforementioned negative example model is a model that is trained such that, when sentences paired with a paraphrastic label indicating that the sentences constitute a negative example are used as inputs from among the aforementioned sentences, the deletion labels and the non-deletion labels attached to the sentences by the alignment unit match the output.

Also, when training a determination model for determining whether or not a pair of two sentences have a paraphrastic relationship, it is possible to train a train a determination model that realizes accurate determination, by using a sentence that is a non-paraphrastic sentence despite a high similarity in terms of the entire sentence and has been generated by the sentence generation apparatus 20 according to the present embodiment. When determining whether or not two sentences are paraphrases of each other by using the determination model thus trained, it is possible to perform accurate determination.

Note that the present invention is not limited to the above-described embodiment, and various modifications and applications can be made without departing from the scope of the present invention.

In the above-described embodiment, the sentence generation apparatus 20 is configured to generate a non-paraphrastic sentence corresponding to an input sentence. However, the sentence generation apparatus 20 is not limited to such a configuration, and may be configured to generate a paraphrastic sentence corresponding to an input sentence.

If this is the case, for each of the words constituting the input sentence, if the word deletion probability attached to the word by using the positive example model is no less than the predetermined first threshold value and the word deletion probability attached to the word by using the negative example model is no greater than the predetermined second threshold value, the deletion unit 24 deletes the word from the input sentence to compose a paraphrastic sentence of the input sentence.

Also, if the sentence generation apparatus 20 generates a non-paraphrastic sentence, the deletion unit 24 may be configured to only use word deletion probabilities from a negative example model. If this is the case, the estimation unit 22 only uses a negative example model to attach a word deletion probability from the negative example model to each word, and the deletion unit 24 deletes a word if the word deletion probability from the negative example model is no less than the second threshold value. The model training apparatus need only train the negative example model.

Also, if the sentence generation apparatus 20 generates a paraphrastic sentence, the deletion unit 24 may be configured to only use word deletion probabilities from a positive example model. If this is the case, the estimation unit 22 only uses a positive example model to attach a word deletion probability from the positive example model to each word, and the deletion unit 24 deletes a word if the word deletion probability from the positive example model is no less than the first threshold value. The model training apparatus need only train the positive example model.

Note that more accurate paraphrastic sentences or non-paraphrastic sentence can be generated when both the positive example model and the negative example model are used compared to when only one of the positive example model and the negative example model is used.

Also, the deletion unit 24 may be omitted and the sentence generation apparatus 20 may be configured as an apparatus that generates a sentence as described below. The aforementioned "sentence as described below" is a sentence generated by the estimation unit 22 attaching a word deletion probability to each of the words constituting an input sentence, using a positive example model. Similarly, the deletion unit 24 may be omitted and the sentence generation apparatus 20 may be configured as an apparatus that generates a sentence as described below. The aforementioned "sentence as described below" is a sentence generated by the estimation unit 22 attaching a word deletion probability to each of the words constituting an input sentence, using a negative example model.

Also, the deletion unit 24 may be omitted and the sentence generation apparatus 20 may be configured as an apparatus that generates two types of sentences as described below. The first type of sentence is a sentence generated by the estimation unit 22 attaching a word deletion probability to each of the words constituting an input sentence, using a positive example model. The second type of sentence is a sentence generated by the estimation unit 22 attaching a word deletion probability to each of the words constituting an input sentence, using a negative example model.

In addition, although the embodiment describes the program as a pre-installed program, the program may be provided in the state of being stored in a computer-readable recording medium.

REFERENCE SIGNS LIST

1 Sentence generation system
10 Model training apparatus
11 Input unit
12 Alignment unit
13 Training unit
20 Sentence generation apparatus
21 Input unit
22 Estimation unit
23 Storage unit
24 Deletion unit
25 Output unit

The invention claimed is:

1. A sentence generation apparatus comprising:
an estimator configured to estimate a word deletion probability for each of words constituting an input sentence, either by:
using a positive example model that has been trained based on a positive example,
the positive example including a sentence and a paraphrastic sentence of the sentence, and
the positive example model being used to generate the paraphrastic sentence of the sentence by deleting a word, or
using a negative example model that has been trained based on a negative example,
the negative example including the sentence and a non-paraphrastic sentence of the sentence,
the non-paraphrastic sentence being distinct from the paraphrastic sentence, and
the negative example model being used to generate the non-paraphrastic sentence by deleting the word; and
a remover configured to remove the word based at least on a combination of a first word deletion probability of the word according to the positive example model and a second word deletion probability of the word according to the negative example model to generate the non-paraphrastic sentence of the input sentence, the first word deletion probability being distinct from the second word deletion probability.

2. The sentence generation apparatus according to claim 1, wherein the estimator attaches, to the each of words constituting the input sentence, the word deletion probability of the word by using the positive example model, and the word deletion probability of the word by using the negative example model, and
the sentence generation apparatus further comprises the remover configured to, either:
for the each of words constituting the input sentence, when the word deletion probability attached to the word by using the positive example model is no less than a predetermined first threshold value and the word deletion probability attached to the word by using the negative example model is no greater than a predetermined second threshold value, delete the word from the input sentence to compose the paraphrastic sentence of the input sentence, or
for the each of words constituting the input sentence, when the word deletion probability attached to the word by using the positive example model is no greater than the predetermined first threshold value and the word deletion probability attached to the word by using the negative example model is no less than the predetermined second threshold value, delete the word from the input sentence to compose the non-paraphrastic sentence of the input sentence.

3. The sentence generation apparatus according to claim 1 the apparatus further comprising:
a receiver configured to receive input training data that consists of data sets each including a pair of sentences and a paraphrastic label that indicates that the pair of sentences represents a positive example in which one of the pair of sentences is the paraphrastic sentence of the other, or a negative example in which one of the pair of sentences is the non-paraphrastic sentence of the other;
an aligner configured to calculate word alignment between the pair of sentences, and for each word in the pair of sentences, if the word does not have an alignment destination, attaches a deletion label to the word, and if the word has the alignment destination, attaches a non-deletion label to the word; and
a trainer configured to, either:
when sentences paired with the paraphrastic label indicating that the sentences constitute a positive example are used as inputs from among the sentences processed by the aligner, train a positive example model for generating the paraphrastic sentence by deleting a word, such that an output matches the deletion label and the non-deletion label attached to the sentence by the aligner, or
when sentences paired with the paraphrastic label indicating that the sentences constitute a negative example are used as inputs from among the sentences processed by the aligner, train the negative example model for generating the non-paraphrastic sentence by deleting the word, such that the output matches the deletion label and the non-deletion label attached to the sentence by the aligner.

4. The sentence generation apparatus according to claim 1, wherein the positive example model or the negative example model is trained in advance by a model training apparatus, the model training apparatus comprising:
a receiver configured to receive input training data that include data sets each including a pair of sentences and a paraphrastic label that indicates that the pair of sentences represents the positive example in which one of the pair of sentences is the paraphrastic sentence of the other, or the negative example in which one of the pair of sentences is the non-paraphrastic sentence of the other;
an aligner configured to calculate word alignment between the pair of sentences, and for each word in the pair of sentences, if the word does not have an alignment destination, attaches a deletion label to the word, and if the word has the alignment destination, attaches a non-deletion label to the word; and
a trainer configured to, either:
when sentences paired with the paraphrastic label indicating that the sentences constitute a positive example are used as inputs from among the sentences processed by the aligner, train the positive example model for generating the paraphrastic sentence by deleting the word, such that an output matches the deletion label and the non-deletion label attached to the sentence by the aligner, or when sentences paired with the paraphrastic label indicating that the sentences constitute the negative example are used as inputs from among the sentences processed by the aligner, train the negative example model for generating the non-paraphrastic sentence by deleting the word, such that the output matches the deletion label and the non-deletion label attached to the sentence by the aligner.

5. A sentence generation method comprising:
estimating, by an estimator, a word deletion probability for each of words constituting an input sentence, either by:
using a positive example model that has been trained based on a positive example,
the positive example including a sentence and a paraphrastic sentence of the sentence, and
the positive example model being used to generate the paraphrastic sentence by deleting a word, or
using a negative example model that has been trained based on a negative example,
the negative example including the sentence and a non-paraphrastic sentence of the sentence, and
the non-paraphrastic sentence being distinct from the paraphrastic sentence, and
the negative example model being used to generate the non-paraphrastic sentence by deleting the word; and
removing the word based at least on a combination of a first word deletion probability of the word according to the positive example model and a second word deletion probability of the word according to the negative example model to generate the non-paraphrastic sentence of the input sentence, the first word deletion probability being distinct from the second word deletion probability.

6. The sentence generation method according to claim 5, the method further comprising:
receiving, by a receiver, input training data that including data sets each including a pair of sentences and a paraphrastic label that indicates that the pair of sentences represents either:
the positive example in which one of the pair of sentences is the paraphrastic sentence of the other, or
the negative example in which one of the pair of sentences is the non-paraphrastic sentence of the other;
calculating, by an aligner, word alignment between the pair of sentences;
for each word in the pair of sentences, when the word does not have an alignment destination, attaching a deletion label to the word, and when the word has the alignment destination, attaching a non-deletion label to the word;
performing one of:
when sentences paired with the paraphrastic label indicating that the sentences constitute the positive example are used as inputs from among the sentences processed by the aligner, training, by a trainer, the positive example model for generating the paraphrastic sentence by deleting the word, such that an output matches the deletion label and the non-deletion label attached to the sentence by the aligner, or
when sentences paired with the paraphrastic label indicating that the sentences constitute the negative example are used as inputs from among the sentences processed by the aligner, training, by the trainer, the negative example model for generating the non-paraphrastic sentence by deleting the word, such that the output matches the deletion label and the non-deletion label attached to the sentence by the aligner.

7. A computer-readable non-transitory recording medium storing computer-executable instructions that when executed by a processor cause a computer system to:
estimate, by an estimator, a word deletion probability for each of words constituting an input sentence, either by:
using a positive example model that has been trained based on a positive example,
the positive example including a sentence and a paraphrastic sentence of the sentence, and
the positive example model being used to generate the paraphrastic sentence of the sentence by deleting a word, or
using a negative example model that has been trained based on a negative example,
the negative example including the sentence and a non-paraphrastic sentence of the sentence,
the paraphrastic sentence being distinct from the non-paraphrastic sentence, and
the negative example model being used to generate the non-paraphrastic sentence by deleting the word; and
remove the word based at least on a combination of a first word deletion probability of the word according to the positive example model and a second word deletion probability of the word according to the negative example model to generate the non-paraphrastic sentence of the input sentence, the first word deletion probability being distinct from the second word deletion probability.

8. The sentence generation apparatus according to claim 2, wherein the positive example model or the negative example model is trained in advance by a model training apparatus, the model training apparatus comprising:
a receiver configured to receive input training data that include data sets each including a pair of sentences and a paraphrastic label that indicates that the pair of sentences represents the positive example in which one of the pair of sentences is the paraphrastic sentence of the other, or the negative example in which one of the pair of sentences is the non-paraphrastic sentence of the other;
an aligner configured to calculate word alignment between the pair of sentences, and for each word in the pair of sentences, if the word does not have an alignment destination, attaches a deletion label to the word, and if the word has the alignment destination, attaches a non-deletion label to the word; and
a trainer configured to, when the pair of sentences paired with the paraphrastic label indicating that the pair of sentences constitutes the positive example are used as inputs from among the pair of sentences processed by the aligner, train the positive example model for generating the paraphrastic sentence by deleting the word, such that an output matches the deletion label and the non-deletion label attached to the sentence by the aligner.

9. The sentence generation apparatus according to claim 2, wherein the positive example model or the negative example model is trained in advance by a model training apparatus, the model training apparatus comprising:
a receiver configured to receive input training data that include data sets each including a pair of sentences and a paraphrastic label that indicates that the pair of sentences represents a positive example in which one of the pair of sentences is the paraphrastic sentence of the other, or a negative example in which one of the pair of sentences is the non-paraphrastic sentence of the other;

an aligner configured to calculate word alignment between the pair of sentences, and for each word in the pair of sentences, if the word does not have an alignment destination, attaches a deletion label to the word, and if the word has the alignment destination, attaches a non-deletion label to the word; and a trainer configured to, when the pair of sentences paired with the paraphrastic label indicating that the pair of sentences constitutes the negative example are used as inputs from among the pair of sentences processed by the aligner, train the negative example model for generating the non-paraphrastic sentence by deleting a word, such that an output matches the deletion label and the non-deletion label attached to the sentence by the aligner.

10. The sentence generation method according to claim 5, wherein the estimator attaches, to the each of words constituting the input sentence, the word deletion probability of the word by using the positive example model, and the word deletion probability of the word by using the negative example model, and the method further comprising, for the each of words constituting the input sentence, when the word deletion probability attached to the word by using the positive example model is no less than a predetermined first threshold value and the word deletion probability attached to the word by using the negative example model is no greater than a predetermined second threshold value, delete the word from the input sentence to compose the paraphrastic sentence of the input sentence.

11. The sentence generation method according to claim 5, wherein the estimator attaches, to the each of words constituting the input sentence, the word deletion probability of the word by using the positive example model, and the word deletion probability of the word by using the negative example model, and the method further comprising, for the each of words constituting the input sentence, when the word deletion probability attached to the word by using the positive example model is no greater than a predetermined first threshold value and the word deletion probability attached to the word by using the negative example model is no less than a predetermined second threshold value, delete the word from the input sentence to compose the non-paraphrastic sentence of the input sentence.

12. The sentence generation method according to claim 5, wherein the positive example model or the negative example model is trained in advance by a model training apparatus, the method further comprising:

receiving input training data that include data sets each including a pair of sentences and a paraphrastic label that indicates that the pair of sentences represents the positive example in which one of the pair of sentences is the paraphrastic sentence of the other, or the negative example in which one of the pair of sentences is the non-paraphrastic sentence of the other;

determining word alignment between the pair of sentences, and for each word in the pair of sentences, if the word does not have an alignment destination, attaches a deletion label to the word, and if the word has the alignment destination, attaches a non-deletion label to the word; and when sentences paired with the paraphrastic label indicating that the sentences constitute a positive example are used as inputs from among the sentences processed, training the positive example model for generating the paraphrastic sentence by deleting the word, such that an output matches the deletion label and the non-deletion label attached to the sentence.

13. The sentence generation method according to claim 5, wherein the positive example model or the negative example model is trained in advance by a model training apparatus, the method further comprising:

receiving input training data that include data sets each including a pair of sentences and a paraphrastic label that indicates that the pair of sentences represents the positive example in which one of the pair of sentences is the paraphrastic sentence of the other, or the negative example in which one of the pair of sentences is the non-paraphrastic sentence of the other;

determining word alignment between the pair of sentences, and for each word in the pair of sentences, if the word does not have an alignment destination, attaches a deletion label to the word, and if the word has the alignment destination, attaches a non-deletion label to the word; and when sentences paired with the paraphrastic label indicating that the sentences constitute a negative example are used as inputs from among the sentences processed, training the negative example model for generating the non-paraphrastic sentence by deleting the word, such that an output matches the deletion label and the non-deletion label attached to the sentence.

14. The computer-readable non-transitory recording medium of claim 7, wherein the estimator attaches, to the each of words constituting the input sentence, the word deletion probability of the word by using the positive example model, and the word deletion probability of the word by using the negative example model, and the computer-executable instructions that when executed by a processor further cause a computer system to, for the each of words constituting the input sentence, when the word deletion probability attached to the word by using the positive example model is no less than a predetermined first threshold value and the word deletion probability attached to the word by using the negative example model is no greater than a predetermined second threshold value, delete the word from the input sentence to compose the paraphrastic sentence of the input sentence.

15. The computer-readable non-transitory recording medium of claim 7, wherein the estimator attaches, to the each of words constituting the input sentence, the word deletion probability of the word by using the positive example model, and the word deletion probability of the word by using the negative example model, and the computer-executable instructions that when executed by a processor further cause a computer system to, for the each of words constituting the input sentence, when the word deletion probability attached to the word by using the positive example model is no greater than a predetermined first threshold value and the word deletion probability attached to the word by using the negative example model is no less than a predetermined second threshold value, delete the word from the input sentence to compose the non-paraphrastic sentence of the input sentence.

16. The computer-readable non-transitory recording medium of claim 7, wherein the positive example model or the negative example model is trained in advance by a model training apparatus, the computer-executable instructions when executed further causing the system to:

receive input training data that consists of data sets each including a pair of sentences and a paraphrastic label that indicates that the pair of sentences represents the positive example in which one of the pair of sentences is the paraphrastic sentence of the other, or the negative example in which one of the pair of sentences is the non-paraphrastic sentence of the other;

determine word alignment between the pair of sentences, and for each word in the pair of sentences, if the word does not have an alignment destination, attaches a deletion label to the word, and if the word has the alignment destination, attaches a non-deletion label to the word; and when sentences paired with the paraphrastic label indicating that the sentences constitute a positive example are used as inputs from among the sentences processed, train the positive example model for generating the paraphrastic sentence by deleting the word, such that an output matches the deletion label and the non-deletion label attached to the sentence.

17. The computer-readable non-transitory recording medium of claim 7, wherein the positive example model or the negative example model is trained in advance by a model training apparatus, the computer-executable instructions when executed further causing the system to:

receive input training data that consists of data sets each including a pair of sentences and a paraphrastic label that indicates that the pair of sentences represents the positive example in which one of the sentences is the paraphrastic sentence of the other, or the negative example in which one of the sentences is the non-paraphrastic sentence of the other;

determine word alignment between the pair of sentences, and for each word in the pair of sentences, if the word does not have an alignment destination, attaches a deletion label to the word, and if the word has the alignment destination, attaches a non-deletion label to the word; and when sentences paired with the paraphrastic label indicating that the sentences constitute the negative example are used as inputs from among the sentences processed, train the negative example model for generating the non-paraphrastic sentence by deleting the word, such that an output matches the deletion label and the non-deletion label attached to the sentence.

18. The sentence generation apparatus according to claim 1, wherein the positive example model is based on a recurring neural network, wherein the recurring neural network generates the word deletion probability associated with the word.

19. The sentence generation method according to claim 5, wherein the positive example model is based on a recurring neural network, wherein the recurring neural network generates the word deletion probability associated with the word.

20. The computer-readable non-transitory recording medium of claim 7, wherein the positive example model is based on a recurring neural network, wherein the recurring neural network generates the word deletion probability associated with the word.

* * * * *